Figure 1:
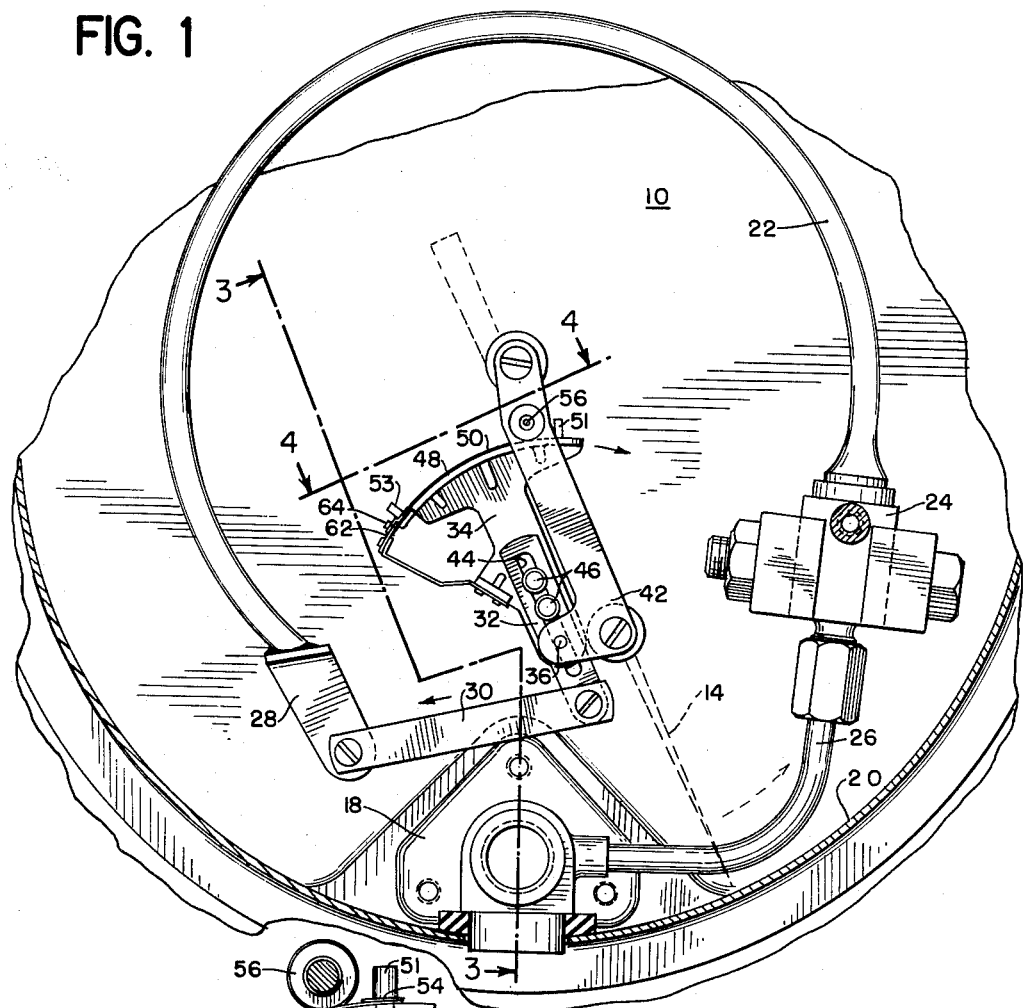

Sept. 7, 1965  J. E. GORGENS ETAL  3,204,472
TAPE DRIVE FOR GAUGES AND THE LIKE
Filed Jan. 7, 1963  2 Sheets-Sheet 1

INVENTORS
JOSEPH E. GORGENS
ROBERT J. INGHAM
ROBERT D. BISSELL
BY
ATTORNEY

Sept. 7, 1965 J. E. GORGENS ETAL 3,204,472
TAPE DRIVE FOR GAUGES AND THE LIKE
Filed Jan. 7, 1963 2 Sheets-Sheet 2

INVENTORS
JOSEPH E. GORGENS
ROBERT J. INGHAM
BY ROBERT D. BISSELL

ATTORNEY

United States Patent Office 3,204,472
Patented Sept. 7, 1965

3,204,472
TAPE DRIVE FOR GAUGES AND THE LIKE
Joseph E. Gorgens and Robert J. Ingham, Fairfield, and Robert D. Bissell, Orange, Conn., assignors, by mesne assignments, to Dresser Industries, Inc., Dallas, Tex., a corporation of Delaware
Filed Jan. 7, 1963, Ser. No. 249,776
7 Claims. (Cl. 74—95)

This invention relates to pressure and temperature gauges and is particularly adapted for use with pressure or temperature gauges of the Bourdon tube type.

A well known type of Bourdon tube instrument comprises a gear segment operatively connected to the free end of a Bourdon tube with the gear segment meshing with a pinion mounted for movement with a shaft which may carry a pointer or the like associated with a dial face. Depending upon the application of the instrument, the fluid within the Bourdon tube will undergo a change in pressure in response to a change in an external condition which is being sensed or measured. The change in pressure of the fluid fill in the Bourdon tube will cause the free end of the tube to deflect with a corresponding movement of the gear segment and pinion resulting in an angular movement of the pinion shaft and pointer.

In certain applications of such a gauge, for example, where the gauge is used as a master gauge for calibration of other gauges, it is important that the gauge be extremely accurate, and more particularly, have a high degree of repeatability and sensitivity. In gauges of the type described above wherein the gauge movement comprises a gear segment and pinion to connect the Bourdon tube to a pointer or the like, friction in the gearing as well as in the linkage between the gear segment and Bourdon tube adversely affects the repeatability of the instrument. To provide gearing with an acceptable friction level results in undesirable increases in cost as well as difficulties in manufacture. Also, with gearing, the problem of backlash and attendant inaccuracies in the gauge often require the use of additional devices to eliminate backlash thus adding to the complexity and cost of the instrument.

In order to reduce the friction in a gauge movement of the type described, it has been proposed to utilize a gearless movement, for example, as shown in U.S. Patents No. 2,930,235 and 2,987,930. Additionally, gearless drives have been suggested in instruments utilizing pressure responsive elements other than Bourdon tubes, for example, as shown in U.S. Patent No. 2,632,694. However, prior attempts such as represented by the aforedescribed patents either do not provide a gauge having a sufficiently high accuracy for such uses as a laboratory gauge or master gauge, or are not suited for use with a Bourdon tube instrument.

Accordingly, it is the object of this invention to provide a novel and improved gauge movement particularly adapted for use in conjunction with a Bourdon tube and which will provide a gauge with materially improved accuracy, repeatability, and sensitivity.

Included within the first mentioned object is the object of providing a novel and improved movement of the type described in which no gears are utilized and one in which there will be a minimum of error friction due to friction or backlash.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 2:
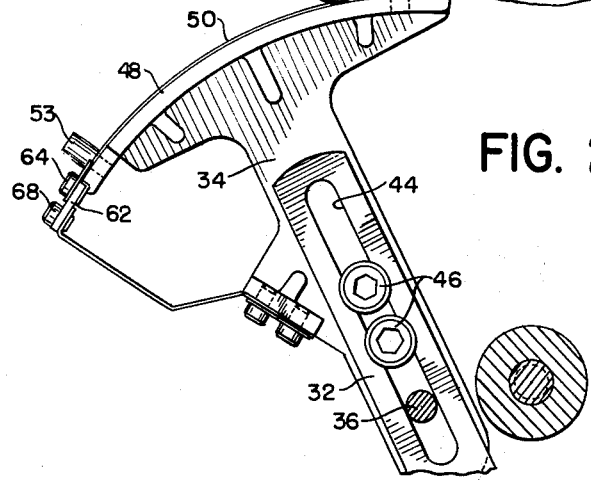
Figure 3:
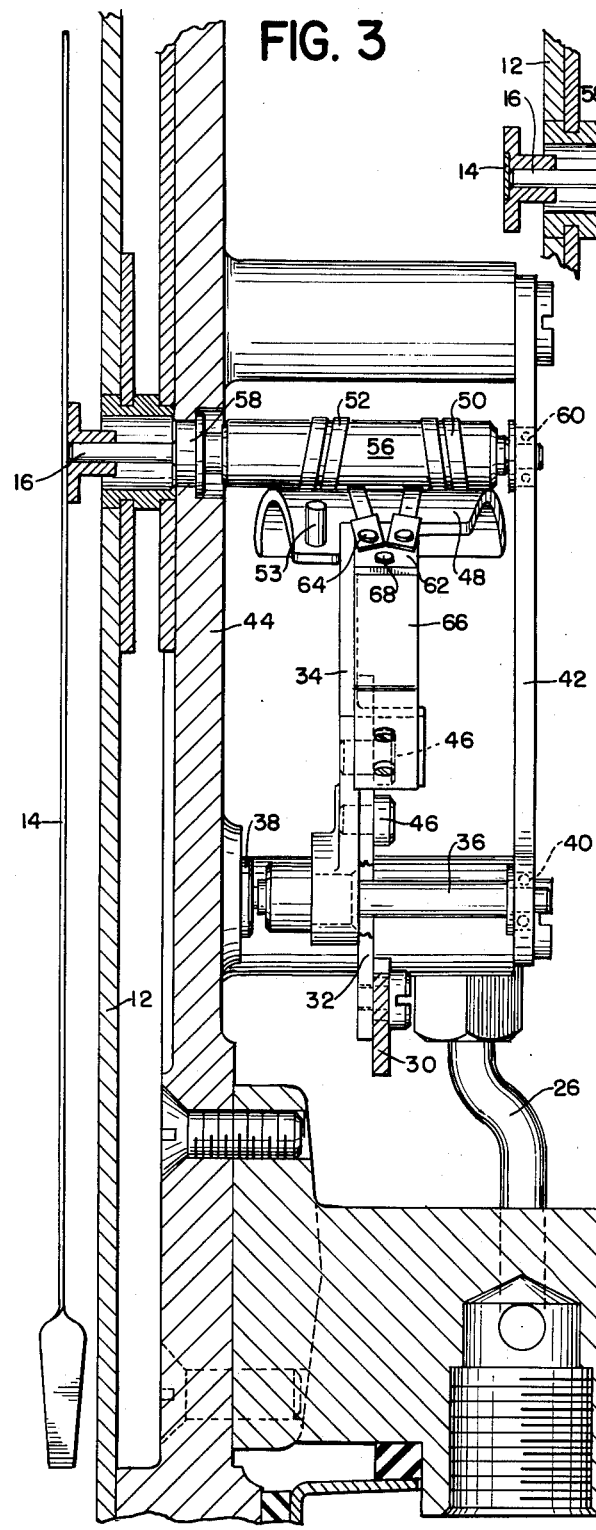
Figure 4:
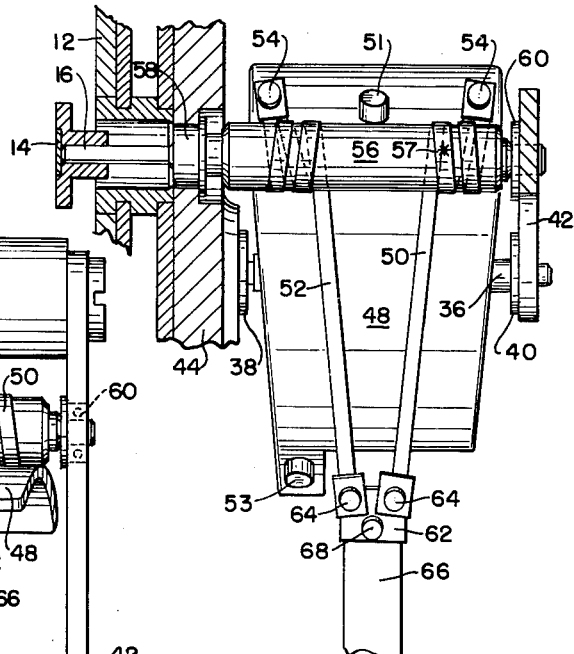

In the drawings:
FIG. 1 is a fragmentary rear elevational view of a gauge incorporating the present invention with a portion of the gauge casing cut away to reveal the gauge movement;
FIG. 2 is an enlarged fragmentary plan view of a portion of the movement of FIG. 1;
FIG. 3 is an enlarged cross sectional view substantially along the line 3—3 of FIG. 1; and
FIG. 4 is an enlarged cross sectional view substantially along the line 4—4 of FIG. 1.

With reference to the drawings, and particularly FIGS. 1 and 3, an instrument of the type with which this invention is concerned is shown in the form of a Bourdon tube pressure gauge. The gauge comprises a base 10 on which is mounted a dial 12 which is fixed relative to the casing. The dial carries indicia, not shown, in terms of pressure. Mounted for movement across the dial is a pointer 14 supported for rotation with a shaft 16. The gauge further comprises a socket assembly 18 extending outwardly through the bottom of a cover 20. The outer extension of the socket assembly 18 is provided with means for connection to a pipe or the like containing pressure fluid. Disposed within the cover 20 is a Bourdon tube 22, one end of which is rigidly connected to a block 24 fixed to the casing 10. The block 24 has an inner passage in communication at one end with the fixed end of the Bourdon tube and at the other end in fluid connection with a tube 26 which in turn is connected to the socket 18 whereby pressure fluid is admitted within the Bourdon tube.

The free end of the Bourdon tube 22 carries a bracket 28 for movement therewith. The bracket 28 is pivotally connected to one end of a link 30. The other end of the link 30 is in driving connection with an elongated slide 32. The slide 32 is in overlying engagement with a segment member 34. With reference to FIGS. 2 and 3, the segment 34 lies in a general plane which is parallel to the general plane of the Bourdon tube. The segment is mounted and pivotally supported by the casing 10 for movement within the general plane of the segment by means of a shaft 36 mounted for movement with the segment. The shaft 36 is supported at one end by a bearing 38 carried by the casing 10 and at the other end by a bearing 40 carried by a top plate 42 which is mounted in fixed spaced parallel relation to the front wall 44 of the casing 10. The shaft 36 extends freely through a slot 44 extending longitudinally of the slide 32. The slide 32 is fixed relative to the segment 34 by means of a pair of clamp screws 46 extending through the slot 44 and threadably engaged with the segment. The shaft 36 is slidably received in the slot 32 so that the spacing of the axes of the shaft 36 and pivotal connection of the slide 32 and link 30 and thus the degree of multiplication of movement provided by the segment 34 may be adjusted in a manner which is well known in the art and need not be further described.

In the specific embodiment shown, the end of segment 34 opposite the link 30 is provided with an arcuate surface, the geometric center of which coincides with the axis of the shaft 36. With particular refrenece to FIGS. 2 to 4, a pair of flexible metal tapes 50 and 52 are pivotally mounted on the segment 34 by means of rivets 54 mounted on the curved surface 48 adjacent one end thereof with each of the rivets being spaced apart axially of the shaft 36 so as to be adjacent the opposite sides of the surface 48. Each of the tapes extends along the curved surface 48 and between this surface and a cylindrical member or drum 56 disposed closely adjacent the curved surface 48. The drum 56 extends parallel to the shaft 36 and coaxially of the pointer shaft 16 and in the particular embodiment shown is integrally with the shaft 16. The drum is rotatably supported at one end by a bearing 58 carried by the front wall 44 of the casing and at the other end by bearing 60 carried by the top plate 42. Each of the tapes 50 and 52 are helically wound about the drum 56 a plurality of turns and then extended outwardly from between the drum and curved surface 48 in opposite directions along the curved surface 48. The tapes are each disposed in a single layer about the drum in frictional driving contact therewith, and no portion of either tape overlaps or overlies any other portion. The other ends of the tapes are pivotally connected in laterally spaced relation to one end of an equalizing member 62 by means of rivets 64. The other end of the equalizing member 62 is pivotally connected to one end of a leaf spring 66 by rivet 68. As most clearly shown in FIG. 2, the other end of the leaf spring is mounted on the segment 34 for movement therewith. The spring 66 is preloaded sufficiently to maintain the tapes 50 and 52 tightly wound around the drum 56. It should be noted that the pivot axes at the ends of the tapes extend at right angles to the general plane of the tape supporting surface 48.

For the reason to be explained hereinafter, only tape 50 is spot welded to the drum 56, as at 57, while the tape 52 is not fixed to the drum. Also, it will be noted that a pair of stops, in the form of upstanding lugs 51 and 53, are mounted on the segment 34 and project radially outwardly from the arcuate surface 48 of the segment.

In the operation of the gauge described above and shown in the accompanying drawings, an increase in pressure of the fluid within the Bourdon tube 22 will cause the tube to deform in a manner tending to straighten the tube whereby the tube tip bracket 28 will be moved in a generally clockwise direction as viewed in FIG. 1. This movement through the link 30 will cause the segment 34 to be moved in a clockwise direction as viewed in FIG. 1 between the limits determined by segment stops 51 and 53 carried by the segment and engageable with the drum. As the segment pivots, the tapes 50 and 52 will cause corresponding rotation of the drum 56 but in a counter-clockwise direction as viewed in FIG. 1 with attendant movement of the pointed 14. The drive of the drum 56 by the segment 34 and tapes 50, 52 is essentially frictionless and without backlash. The use of a plurality of tapes wound about the drum provides a more positive drive than would be the case if only a single tape of the same width and turns about the drum were utilized. Also, it should be noted that the tapes 50, 52 are wound about the drum in opposite directions. More particularly the tape 50 is wound in a clockwise direction as viewed in the direction of FIG. 1, while the tape 52 is wound in a counter-clockwise direction as viewed in the direction of FIG. 1. This arrangement of tapes reduces the radial load on the bearings supporting the drum as compared to the case where a single tape is used or where two tapes are used but wound in the same direction. The reason for this will be apparent from the consideration of FIG. 4. Inasmuch as the ends of each tape extend outwardly in opposite directions from the drum and the tape is resiliently loaded in the direction of its longitudinal axis, a couple will be imposed on the drum which in the case of the tape 50 will act in a counter-clockwise direction. The oppositely wound tape 52 also imposes a couple on the drum but in an opposite direction, thus cancelling out the couple imposed by the tape 50. While it is within the scope of this invention to utilize more than two tapes, it is preferred that the number of tapes by a multiple of two with one half the tapes wound oppositely from the remaining tapes.

The overlying surfaces of the tapes and drum are, in the specific embodiment shown, finished to provide a smooth surface. The fine finish is desired in order to provide the desired accuracy of the "gear ratio" between the segment and drum. While a roughening of these surfaces might increase the friction level between the tapes and drum, it could also adversely affect the accuracy of the movement. However, where a more positive drive is necessary or desirable, and a lesser degree of accuracy can be tolerated, it is within the scope of the invention to roughen the driving surfaces of either the tapes or drum or both. As has been noted above, both ends of the tape are pivotally mounted to the segment and equalizing member respectively. This assures that the force exerted by the tapes will act along the longitudinal axis of the tapes to provide a self-aligning arrangement. Also, the pivotal mounting of both ends of the tapes permits the tapes to automatically compensate for any misalignment due, for example, to a slight taper of the drum surface engaged by the tapes. After a few cycles of initial operation, the tapes will find a stable position relative to the drum and will remain in this position during subsequent cycles and will not tend to travel axially of the drum.

In order to eliminate any zero shift between the segment and drum, the tape 50 is spot welded to the drum as shown at 57 in FIG. 4. This weld will eliminate any relative sliding movement of the tape 50 relative to the drum, such as might be caused by rapid fluctuations in pressure causing rapid oscillations of the segment. The weld should be located so as not to interfere with normal operation of the tapes. This weld is not intended to provide a driving connection between the tape 50 and drum, and in the preferred embodiment shown in the drawings, the great majority of the drive force between the segment and drum is provided by the frictional driving contact between the tapes and the drum.

Not only is it not necessary to weld the tape 52 to the drum, but also it may be disadvantageous to do so. Where both tapes are welded to the drum, if there is any significant inaccuracy of location between the two welds, one tape may be slack or at least engage the drum less firmly than the other. This could be compensated for by providing a resilient connection of the tapes to the segment at both ends of the tapes rather than merely at one end. However, where a resilient connection is provided at both ends of the tapes, there may be an adverse effect on the repeatability of the system. Where two opposed springs are used on the opposite ends of the tapes, one of the springs may not return to its initial start position as accurately as desired, with a resulting inaccuracy in the indication of the instrument. On the other hand, the resilient connection at both ends of the tapes may be advantageous where the instrument is subject to rapid fluctuations in pressure. Therefore, where it is necessary or desired, it is within the scope of this invention to provide a resilient connection of both ends of the tapes to the segment substantially in the manner shown in connection with one end of the tapes as aforedescribed.

The tension equalizing member 62 and its manner of connection to the tapes 50, 52 and spring 56, assures an equal tension will be applied to both tapes and also permits self compensation for minor differences in tape lengths. More particularly, it should be noted that the pivot 68 is spaced intermediate the pivots 64, while the pivots 64 are spaced apart laterally of the curved surface 48 and axis of the shaft 36. As heretofore mentioned, the spring 66 is preloaded to provide tension on the tapes sufficient to assure the necessary level of friction between the tapes and drum to provide an essentially positive drive. The rate of the spring is selected to assure that tape tension will be maintained at the desired level during oscillation or rapid movement of the segment and so as to avoid any oscillation of the free end of the spring relative to the segment which could reduce tape tension and thus the sensitivity of the system. It should be particularly noted that the mounting of the tension spring 66 on the segment assures that the spring will exert a constant tension on the tape regardless of the position of the segment about its axis. This would not be the case where one end of the spring was mounted, for example, to the casing 10 whereby the bias on the tapes would vary with the position of the segment about its axis. Also, it should be observed that the mounting of the spring on the segment eliminates any tendency of the spring to resist movement of the segment in either direction about its axis.

It has been found that in order to provide and maintain extreme sensitivity and essentially a linear relation between the movement of the segment 34 and drum 56 the points of tangency of the tapes 50, 52 relative to the drum axis must be essentially fixed and must not move angularly of the drum axis in response to movement of the drum or segment. For the purpose of this invention and particularly the appended claims, the points of tangency of a tape relative to the drum are defined as the points at which the portions of one tape extending outwardly of the drum initially contact the external surface of the drum. In order to provide such a relationship, the drum should be located closely adjacent the curved surface 48 of the segment and preferably at a distance only slightly greater than the thickness of the tapes. Also, the tapes should extend outwardly of the drum from between the drum and segment, and the surface 48 of the segment should be curved concentrically of the axis of the segment. In the specific embodiment shown the points of tangency of the tapes relative to the drum are in very closely spaced relation to each other on opposite sides of the line extending at right angles to the curved surface 48 and passing through the drum axis.

While if desired, the tapes could be brought off the side of the drum opposite the segment, the desired fixing of the points of tangency of the tape relative to the drum would not be maintained over as a great a degree of angular movement of the segment for the same size segment. In other words, in order to achieve linearity over the same angular movement of a given size segment, the points of connection of the ends of the tapes would have to be spaced apart about the segment axis a substantially greater distance. The curved surface 48 on the segment and its concentric relation to the segment axis provides a support for the tapes adjacent their points of departure from the drum also to assist in maintaining the desired fixing of the points of tangency of the tapes relative to the drum over substantially the entire normal range of movement of the segment. Also, if the tapes came off the opposite side of the drum or if there was no curved supporting surface 48, as described, each of the tapes would have a substantial component of movement in a direction angularly of the driving surface of the tape, particularly near the extreme ends of movement of the segment. This lateral component of movement rather than a wholly longitudinal movement of the tape would obviously reduce the sensitivity of the instrument. This is particularly important, for example, in a laboratory gauge where sensitivities on the order of .001% are desired.

While in the preferred embodiment a high degree of linearity of movement between the segment and drum is desired, it is within the scope of this invention where desirable, for example, to provide a predetermined non-linearity of movement in order to compensate for other non-linearities in the system, or to compensate for non-linearities in the input signal to the instrument. This might be accomplished, for example, by arranging the surface 48 eccentrically of the segment axis or by providing an irregular tape supporting surface on the segment. Also, the tapes might be brought off the opposite side of the drum, or the tape supporting surface eliminated in order to introduce non-linearities which are essentially eliminated in the preferred embodiment shown in the drawings.

Further, the skewing of the tapes 50 and 52, whereby the tapes are spaced apart at one end a distance substantially greater than at the other ends is sufficient to assure that there will be no overlap or overlying of the tapes. This further assures linearity of response in that if a portion of either of the tapes overlaps another portion thereof, there will be a portion of drum movement which will be non-linear with regard to segment movement. The skewing of the tapes together with the self aligning features heretofore described assure that no portion of either tape will overlap another portion thereof to preserve the desired linear response between the drum and segment. This linearity is not present in the case of a single tape wound about the drum with the turns of the tape overlying each other.

The segment stops 51 and 53 are positioned so that that they will engage the drum to provide a limit to movement of the segment in either direction. The location of the stops is selected both to assure that the segment will not overtravel and possibly tear the tapes from the mounting rivets therefor, and also to assure that the segment will be stopped before the extreme ends of the tape are sufficiently close to the underside of the drum whereby further movement of the segment will cause the points of tangency of the tapes at one end thereof to be moved about the drum axis.

While the present invention has been shown and described in connection with a segment and drum assembly in which the segment is driven by a Bourdon tube, it will be apparent that the invention is not necessarily limited to the use of a Bourdon tube. For example, a bellows could be utilized to drive the segment in substantially the same manner as a Bourdon tube. Also, if desired, the gauge movement may be mounted between the top plate 42 and a bottom plate similar to the top plate but disposed on the other side of the movement. The bottom plate would be adapted to be mounted on the gauge casing and would mount the bearings 38 and 58. With such a construction the movement may be supported in the casing for selective adjustment about the axis of the drum and pointer shaft to provide means to calibrate the gauge. Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

We claim:

1. In a tape drive mechanism, a cylindrical member rotatably mounted at its ends for movement about its longitudinal axis, a pivoted member having a pivot axis extending parallel to said longitudinal axis and having a curved tape supporting surface disposed concentrically of said pivot axis and in closely spaced relation to said cylindrical member, a flexible inextensible tape helically wound about said cylindrical member with no portion of the tape overlying another portion thereof, the ends of said tape extending generally laterally of said cylindrical member from between said cylindrical member and tape supporting surface and along said tape supporting surface, means pivotally connecting one end of the tape to said tape supporting surface for movement about an axis extending at right angles to said tape supporting surface, a preloaded tape tensioning spring carried by said pivoted member, and means pivotally connecting the other end of said tape to said spring for movement about an axis extending at right angles to said tape supporting surface.

2. In a tape drive mechanism a cylindrical member mounted for movement about its longitudinal axis, a drive member mounted for movement generally laterally of said longitudinal axis, a pair of elongated flexible inextensible members oppositely helically wound about said cylindrical member in axially spaced relation, the ends of each flexible member extending in opposite directions laterally of said cylindrical member, means connecting one end of one flexible member and the corresponding end of the other flexible member to said drive member for movement therewith, a tension spring carried by said drive member, and means connecting the other ends of said flexible members to said spring including means for equalizing the spring force on said other ends of said flexible members.

3. In a tape drive mechanism, a cylindrical driven member mounted for movement about its longitudinal axis, a drive member movable generally laterally of the longitudinal axis of said cylindrical member, a pair of flexible inextensible tapes helically wound in a single layer about said cylindrical member in opposite directions and in axially spaced relation, one end of the tapes extending in one direction from said cylindrical member and in diverging relation, the other ends of the tapes extending in the opposite direction from said cylindrical member and in converging relation, means pivotally connecting one end of the tapes to said drive member for movement about an axis extending at right angles to the path of movement of said drive member, a preloaded tape tensioning spring carried by said drive member and acting in the direction of movement of the drive member, and a tape tension equalizing member pivotally connected to the other ends of the tape and to said spring for relative movement therebetween about axes extending at right angles to the path of movement of said drive member.

4. In a tape drive mechanism, a cylindrical rotatable drum, a pivoted member mounted for movement about an axis extending longitudinally of the axis of said drum and having an arcuate tape supporting surface extending concentrically of the axis of said pivoted member and disposed in closely spaced relation to the surface of said drum, a pair of flexible inextensible tapes helically wound about the drum in opposite directions and each in a single layer, said tapes being spaced apart axially of said drum and each having ends extending in opposite directions from between the drum and tape supporting surface and along said tape supporting surface, and means pivotally connecting the ends of the tapes to said drive member for movement about axes extending at right angles to said tape supporting surface.

5. In a tape drive mechanism a cylindrical rotatable drum, a pivoted drive member having a pivot axis extending parallel to the axis of said drum and having an arcuate tape supporting surface disposed concentrically of said pivot axis and closely adjacent the peripheral surface of the drum, a flexible inextensible first tape wound about said drum in one direction and in a single layer with the ends of the tape extending in opposite directions along said tape supporting surface from between said drum and said tape supporting surface, a flexible inextensible second tape helically wound about said drum in a direction opposite said one direction and in a single layer, said second tape being spaced from said first tape axially of said drum, the ends of said second tape extending in opposite directions along said tape supporting surface from between said drum and tape supporting surface, means pivotally connecting the ends of said first and second tapes disposed on one side of the drum to said tape supporting surface for movement about an axis extending at right angles to said tape supporting surface, a preloaded tension spring connected at one end to said pivoted member, a tension equalizing member pivotally connected to said spring for movement about an axis extending generally at right angles to said tape supporting surface, and means pivotally connecting the other end of each of said tapes to said equalizing member for pivotal movement about an axis extending at right angles to said tape supporting surface.

6. In a tape drive mechanism a cylindrical rotatable drum, a pivoted member mounted for movement about an axis extending parallel to the axis of said drum and having an arcuate tape supporting surface extending concentrically of the axis of said pivot member and disposed closely adjacent said drum, a pair of flexible inextensible tapes wound about said drum in opposite directions, each of the tapes being wound in a single layer and being spaced axially of the drum from the other tape, each tape having opposite ends extending in opposite directions along said tape supporting surface from between said drum and said tape supporting surface, means pivotally connecting one end of the tapes to said tape supporting surface for movement about an axis extending at right angles to said tape supporting surface, and means pivotally connecting the other ends of the tapes to said pivoted member for movement about axes extending at right angles to said supporting surface and urging with equal force said other ends of the tapes away from said drum and along said tape supporting surface.

7. In a tape drive mechanism, a rotatable cylindrical drum, a pivoted member mounted for movement about an axis extending parallel to the axis of said drum and having an arcuate tape supporting surface disposed concentrically of the axis of said pivoted member and closely adjacent the surface of said drum, a pair of flexible inextensible tapes helically wound each in a single layer about said drum, said tapes being wound in opposite directions with the ends of each of the tapes extending from between said drum and tape supporting surface and in opposite directions along said tape supporting surface, means pivotally connecting the ends of the tapes extending in one direction from the drum to said tape supporting surface for movement about axes extending at right angles to said tape supporting surface, a leaf spring mounted at one end on said pivoted member, the other end of said spring being movable generally toward and away from said drum, an equalizing member pivotally mounted on said other end of the spring for movement about an axis extending at right angles to said tape supporting surface, the other ends of said tapes being pivotally connected to said equalizing member for movement about axes spaced apart axially of said drum and extending at right angles to said tape supporting surface, the pivot axis of said equalizing member being spaced between the pivot axis of said other ends of the tubes and on the side thereof opposite said drum, said spring urging said other end of the tapes away from said drum and along said tape supporting surface, and means fixing one only of said tapes intermediate its ends to said drum.

References Cited by the Examiner

UNITED STATES PATENTS

| 92,411 | 7/69 | Widmayer | 74—95 X |
| 2,113,164 | 4/38 | Williams | 74—95 |
| 2,149,216 | 2/39 | Graveley | 74—95 |
| 2,195,400 | 4/40 | Arens | 74—501 |
| 2,505,111 | 4/50 | Hall | 74—95 X |
| 2,948,887 | 8/60 | Mounteer et al. | 74—95 X |

FOREIGN PATENTS

| 1,117,040 | 5/56 | France. |
| 37,641 | 8/23 | Norway. |
| 14,994 | 9/01 | Sweden. |

BROUGHTON G. DURHAM, *Primary Examiner.*

MILTON KAUFMAN, *Examiner.*